Aug. 5, 1930.        A. L. WEIS        1,772,376
AUTOMOBILE SIGNALING APPARATUS
Filed Nov. 4, 1929        3 Sheets-Sheet 1

Inventor:
Andrew L. Weis
By Arthur F. Durand
Atty.

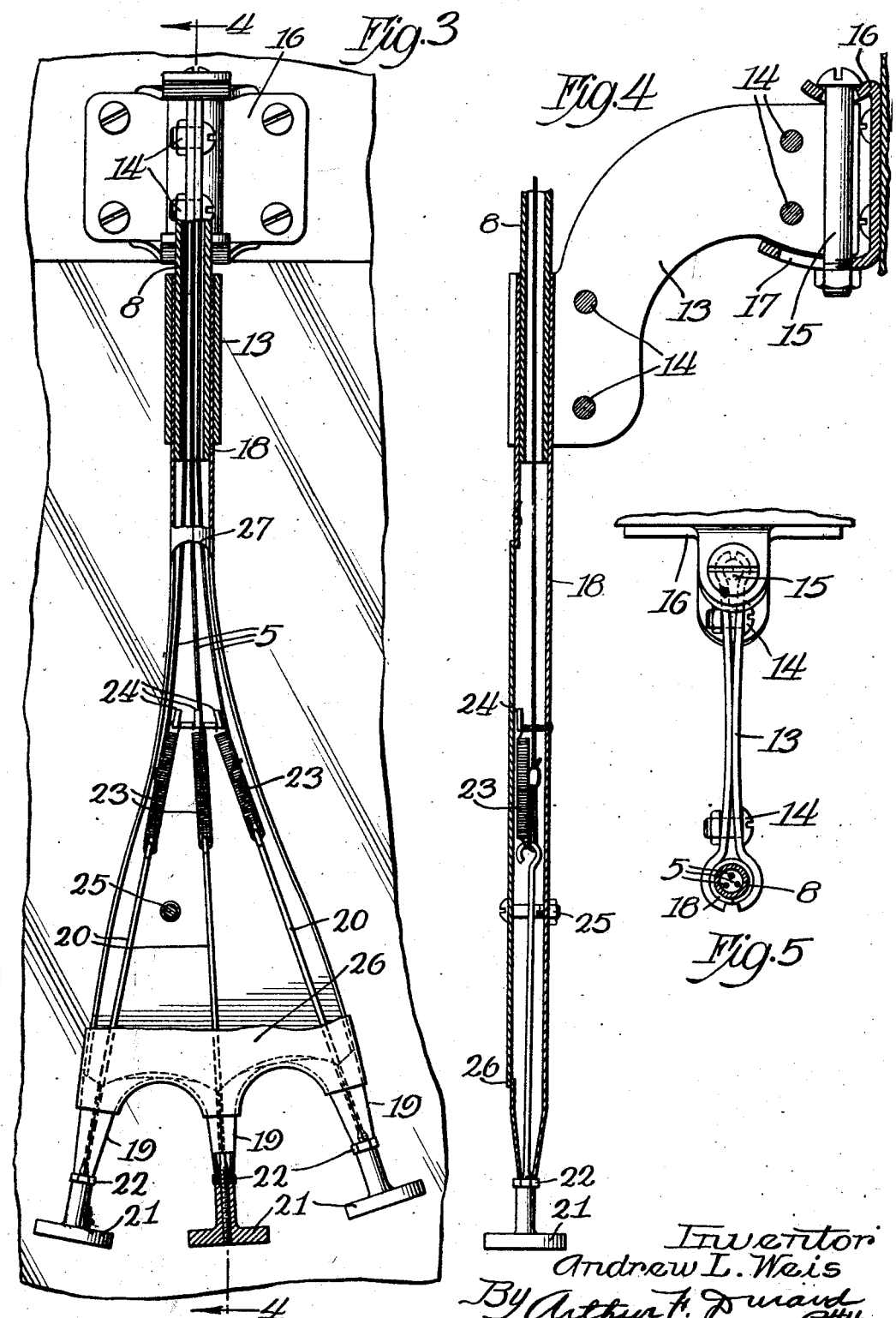

Aug. 5, 1930.  A. L. WEIS  1,772,376
AUTOMOBILE SIGNALING APPARATUS
Filed Nov. 4, 1929   3 Sheets-Sheet 3
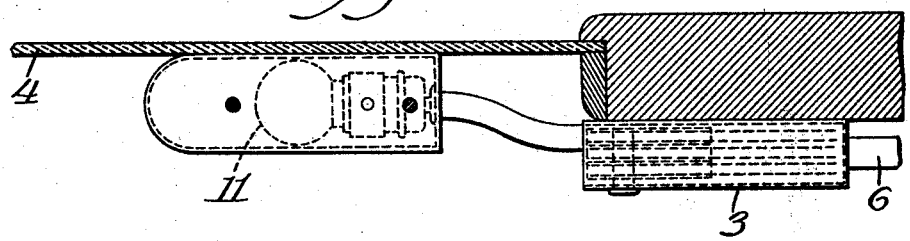
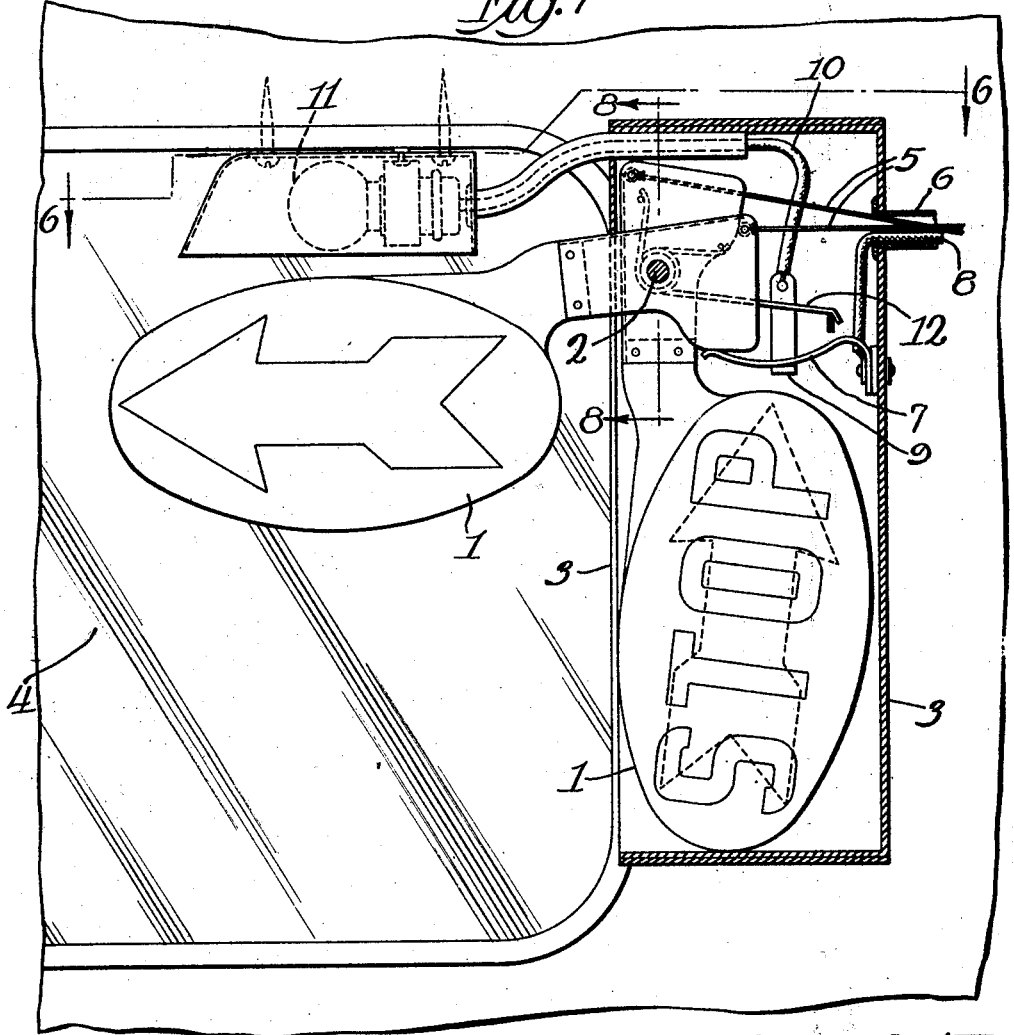
Inventor
Andrew L. Weis
By Arthur A. Durand
Atty.

Patented Aug. 5, 1930

1,772,376

UNITED STATES PATENT OFFICE

ANDREW L. WEIS, OF FORT LAUDERDALE, FLORIDA

AUTOMOBILE SIGNALING APPARATUS

Application filed November 4, 1929. Serial No. 404,591.

This application is subordinate to prior applications Serial No. 364,352, filed May 20, 1929, and Serial No. 374,888, filed June 29, 1929.

This invention relates to signals for automobiles, and more particularly to signals that are located in the rear of a closed car, in a position to be visible through the rear window of the car or automobile body, and which are provided with controlling means located in front of the driver, whereby the latter can signal to drivers of vehicles in the rear any intention to turn to the right or the left, or to stop.

Generally stated, the object of the invention is to provide novel and improved means for controlling the signaling apparatus, located in front of the driver, comprising a plurality of movable handles arranged separately in spaced relation, in a group, but movable independently of each other in different planes, and thus all within easy reach of the driver.

It is also an object to provide certain details and features of construction and combinations tending to increase the general efficiency and the desirability of an automobile signaling apparatus of this particular character.

To the foregoing and other useful ends, the invention consists in matters hereinafter set forth and claimed and shown in the accompanying drawings, in which—

Fig. 3 is an enlarged vertical section on line 3—3 in Fig. 1 of the drawings;

Fig. 4 is a vertical section on line 4—4 in Fig. 3 of the drawings;

Fig. 5 is a plan of the parts shown in Figs. 3 and 4 of the drawings;

Fig. 6 is an enlarged detail horizontal section on line 6—6 in Fig. 7 of the drawings;

Fig. 7 is a plan of the parts shown in Fig. 6 of the drawings, with certain portions in vertical section for convenience of illustration;

Figure 1:
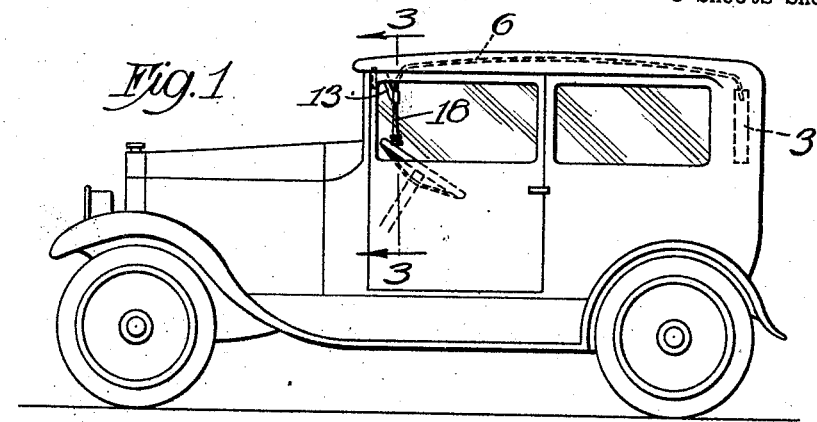
Fig. 1 is a side elevation of an automobile equipped with signaling apparatus embodying the principles of the invention.
Figure 8:
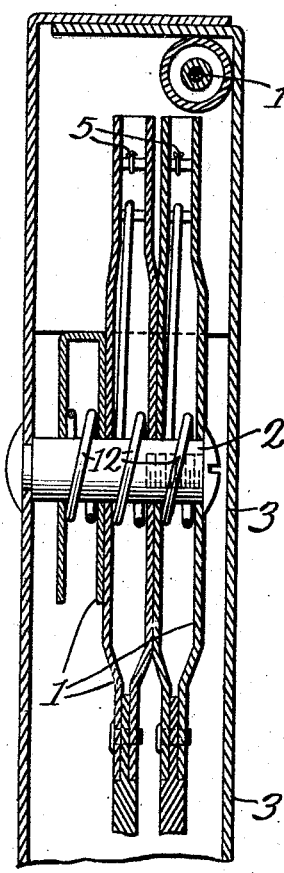
Fig. 8 is a detail vertical section, on a larger scale, on line 8—8 in Fig. 7 of the drawings.

As thus illustrated, the signals 1 to be controlled are, as shown, three in number and are in the form of pivoted semaphores mounted on the horizontal pivot 2, which latter is suitably supported by and within the casing 3, which is secured in any suitable or desired manner to the interior of the automobile body adjacent the rear window 4 thereof, whereby these signals, when raised to horizontal position, are visible through said window to drivers of vehicles in the rear. The three signals or semaphores are controlled by the wires or flexible connections 5 that lead thereto through the tube 6 that extends to the forward part of the body, as will hereinafter more fully appear. When the signals or semaphores are raised, they engage the spring 7, which latter is connected by an insulated conductor 8 with a suitable source of current, this spring 7 being pressed downwardly against the stationary electrical contact 9, suitably supported by the casing 3 in the position shown. An electrical conductor 10 connects the contact 9 with the electric lamp 11, the other terminal of which latter is grounded, whereby a circuit is closed though this lamp and the source of electric current when any signal or semaphore is raised into the position shown in Fig. 7 of the drawings, whereby the signals or semaphores are illuminated to make them visible at night. Springs 12 are provided to restore the signals or semaphores to normal or vertical position, within the casing 3, as will hereinafter more fully appear. One signal may have an arrow pointing to the left on the face thereof, and another signal may have a similar arrow pointing to the right of its face, and a third signal or semaphore may bear the word "Stop", or anything else desired.

At the front of the body, immediately in front of the driver, the tube 8 is bent down and held in a two-part bracket 13, the halves of which are clamped together by the bolts 14, and the upper end of the bracket is clamped on the vertical pivot bolt 15, as shown more clearly in Figs. 4 and 5 of the drawings. The pivot bolt 15 is supported by a bracket 16 secured to the inside of the corner portion of the body directly in front of the driver. This bracket 16 has its lower portion formed with a slot 17, which permits of some tilting adjustment of the pivot 15, and of the bracket 13, by moving the lower end portion of the bolt 15 outwardly a distance in said slot,—this for the convenience of the driver, as will be understood.

The tube 8 is extended below the lower end of the bracket 13 that is broadened into a housing 18, terminating at its lower end in three tapered portions 19, as shown. The wires 5, previously mentioned, extend downwardly through the upper portion of the housing 18 and are connected to the upper ends of rods 20, enclosed within said housing, and provided at their terminals or lower ends with handles 21, as shown. These handles are screwed upon the screw-threaded lower portions of the rods 20 and lock nuts 22 are provided to lock these handles in any desired adjusted position. Coil springs 23 have their lower ends attached to the upper ends of the rods 20 and have their upper ends attached to the hooks 24 provided within the housing 18, as shown. Preferably, the housing 18 is not integral with a tube 8, but is made of somewhat thinner metal, and is telescoped over the lower end portion of the tube 8, as shown in Figs. 3 and 4 of the drawings.

With the foregoing construction and arrangement the handles 21 are all within easy reach of the driver, are spaced apart in a group, but are operable in different planes, whereby the housing 18 and the handles 21 may set close to the inner side of the corner post of the car body, as shown, and this can be facilitated by adjustment of the bracket 13 on its pivot 15, and by adjustment of the upper portion of the housing 18 within the bracket 13, in a manner that will be readily understood.

Figure 2:
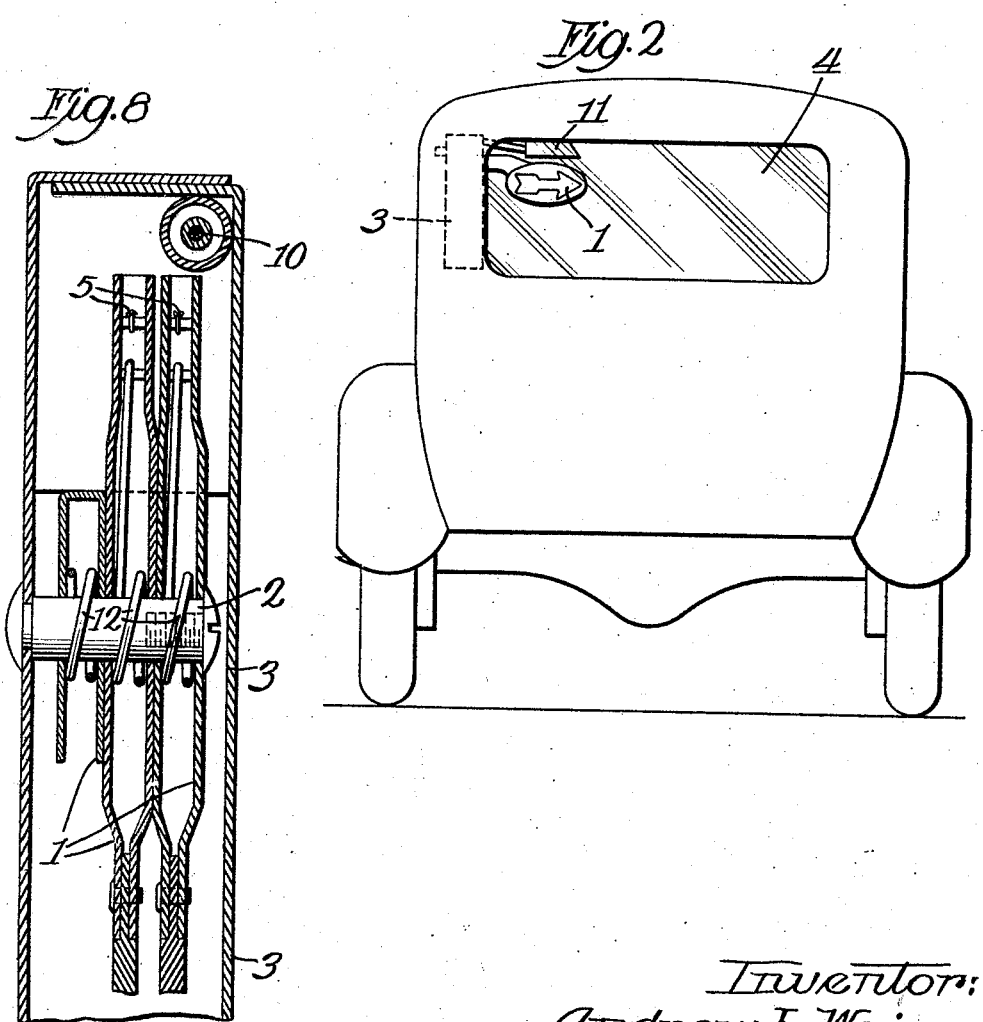
Fig. 2 is an enlarged rear elevation of said automobile.

When one of the handles 21 is pulled downward by the driver, the corresponding signal or semaphore 1 will be raised into the position shown in Figs. 2 and 7 of the drawings. The face of the lower portion of the housing 18, adjacent the handles 21, can be marked to indicate the function of each handle, to show which signal it is connected with, so that the driver may see at a glance which handle must be pulled when it is intended to turn to the right, or when it is intended to turn to the left, or when it is intended to stop the vehicle.

If desired, the housing 18 can be divided centrally in the plane thereof, to form two corresponding halves, and these halves can be held together by a bolt 25 or other suitable means, whereby the parts may be readily assembled and may be easily accessible when in use, if such is necessary or desirable. One section of the housing casing 18 may be longer than the other to include the tapered portions 19, there being no necessity of dividing these guide portions 19 into halves, it being sufficient if the smaller, shorter section of the housing 18 is made to terminate at the dividing line 26, shown in Fig. 3 of the drawings, and the upper end of the smaller casing section may terminate a distance below the lower end of the tube 8, as at line 27, thus providing a sort of cover for the front of the housing 18, which can easily be removed to afford access to the springs 23 and to other parts within the casing or housing thus provided. The tapered portions 19 form guides for the wires 20, and their ends provide shoulders for the handles 21, thus determining the normal positions of the handles. The springs 23 help to keep the handles, or the lock nuts 22 of said handles, normally against said shoulders, and thus help to restore the handles to their normal positions after being operated by the driver.

It will be understood that for the broader purposes of the invention, the signals or semaphores may be differently located or arranged, although preferably located within the car body at the rear thereof, as shown and described. Also, for the broader purposes of the invention, the controls thus provided in front of the driver may be employed in connection with signaling means of any suitable or desired character, although preferably in combination with signals or semaphores of the kind shown and described.

What I claim as my invention is:

1. Signaling apparatus for automobiles or other vehicles, comprising controlling means in the form of a plurality of pull handles disposed within reach of the driver, said handles being spaced apart in a group with one at the right side and the other at the left side of said group, in position whereby each handle is operable in a different plane without disturbing the other, means for detachably mounting said controlling means on the vehicle, signaling means separately mounted on the vehicle, and pull connections extending from said handles to said signaling means, whereby each handle controls a different signal, each handle being movable in a straight line coincident with the adjacent portion of its allotted pull connection.

2. A structure as specified in claim 1, comprising a housing with a plurality of lower end portions forming guides, and shoulders at the ends of said guides for the normal positions of said handles, said housing enclosing portions of said connections from the handles to said signaling means, together with a tube enclosing the remaining portions of said connections between the housing and said signaling means, said tube supported by said controlling means support.

3. A structure as specified in claim 1, there being a third handle between the said right and left handles, with suitable connection from this third handle to said signaling means.

4. A structure as specified in claim 1, comprising an adjustable bracket for supporting said controlling means in desired position in front of the driver, said bracket being mounted to swing about a vertically disposed axis.

5. A structure as specified in claim 1, comprising an adjustable bracket for supporting said controlling means in desired position in front of the driver, said bracket being mounted to swing about a vertically disposed axis, and said bracket being also mounted to tilt upwardly to adjust the position of said handles toward or away from the driver.

6. A structure as specified in claim 1, said signaling means comprising a plurality of semaphores within the body of the vehicle and visible through the rear window thereof.

7. A structure as specified in claim 1, comprising a housing with a plurality of lower end portions forming guides, and shoulders at the ends of such guides for the normal positions of said handles, said housing enclosing portions of said connections from the handles to said signaling means, together with a tube enclosing the remaining portions of said connections between the housing and said signaling means, said signaling means comprising a plurality of semaphores within the body of the vehicle and visible through the rear window thereof.

8. In signaling apparatus for motor vehicles, the combination of a plurality of handles disposed in front of the driver, said handles arranged in a group, adjustable as a group to render convenient and effective the operation thereof, with one handle at the right side and another handle at the left side of said group, signaling means, and means whereby said signaling means is responsive to operation of said handles by the driver.

9. A structure as specified in claim 8, there being a middle handle disposed between said right and left handles, and means whereby said signaling means is also responsive to operation of said middle handle.

10. Signaling apparatus for automobiles or other vehicles, comprising controlling means in the form of a plurality of pull handles disposed within reach of the driver, said handles being spaced apart in a group with one at the right side and the other at the left side of said group, in position whereby each handle is in a different plane and operable without disturbing the other, signaling means mounted on the vehicle, and pull connections extending from said handles to said signaling means, whereby each handle controls a different signal, comprising an adjustable bracket for supporting said controlling means in desired position in front of the driver, said bracket being mounted to swing about a vertically disposed axis.

11. Signaling apparatus for automobiles or other vehicles, comprising controlling means in the form of a plurality of pull handles disposed within reach of the driver, said handles being spaced apart in a group with one at the right side and the other at the left side of said group, in position whereby each handle is in a different plane and operable without disturbing the other, signaling means mounted on the vehicle, and pull connections extending from said handles to said signaling means, whereby each handle controls a different signal, comprising an adjustable bracket for supporting said controlling means in desired position in front of the driver, said bracket being mounted to swing about a vertically disposed axis, and said bracket being also mounted to tilt upwardly to adjust the position of said handles toward or away from the driver.

12. In automobile signaling apparatus, the combination of a tube, pull wires in said tube, signaling means responsive to a pull on said wires, means for mounting said signaling means on the automobile, a controller comprising a plurality of converging rods each connected with one of said wires and a pull handle for each rod, and separate means for mounting said controller on the automobile.

13. A structure as specified in claim 12, each handle having screw adjustment on its allotted rod, thereby to take up slack in the wires and insure proper signalling action.

14. A structure as specified in claim 12, and a coil spring for each rod, each coil spring serving to exert a pull on its allotted wire and thereby restore said signaling means to normal position.

15. A structure as specified in claim 12, said signaling means being at one end of said tube in the rear of the automobile, and said controller being at the other end of the tube in front of the driver.

16. A structure as specified in claim 12, comprising adjusting means to shift the position of said controller bodily, in different directions, and to maintain such adjustment without disturbing the position of said signaling means, thereby to suit the convenience of the driver.

17. In automobile signaling apparatus, the combination of a plurality of pivoted semaphores forming signals, means for mounting said semaphores on signaling position on the car, a plurality of downwardly movable pull handles, wires connecting said handles with said semaphores, a tube enclosing said wires, a controller casing supporting said handles in operative position, said handles being disposed side by side, in spaced relation, with each handle operable in a different direction from the others, and means for adjustably suspending the upper end of said casing above the steering wheel in front of the driver.

Specification signed this 28th day of October, 1929.

ANDREW L. WEIS.